Aug. 17, 1937.  A. SOMMERFELD  2,090,489
PROCESS FOR THE MANUFACTURE OF MOLDED ARTICLES
Filed May 24, 1934  3 Sheets-Sheet 1
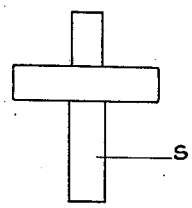
FIG. 1
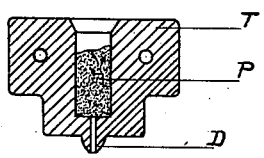
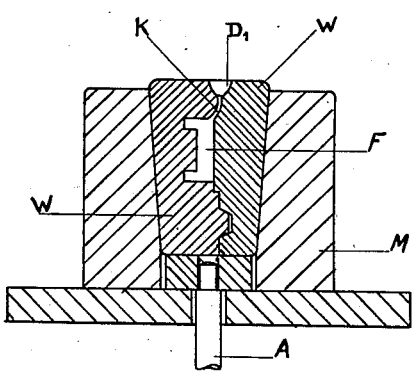
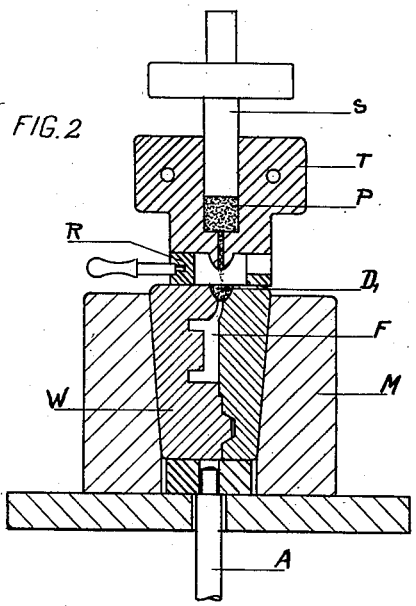
FIG. 2
Arthur Sommerfeld
INVENTOR
BY Mock & Blum
ATTORNEYS

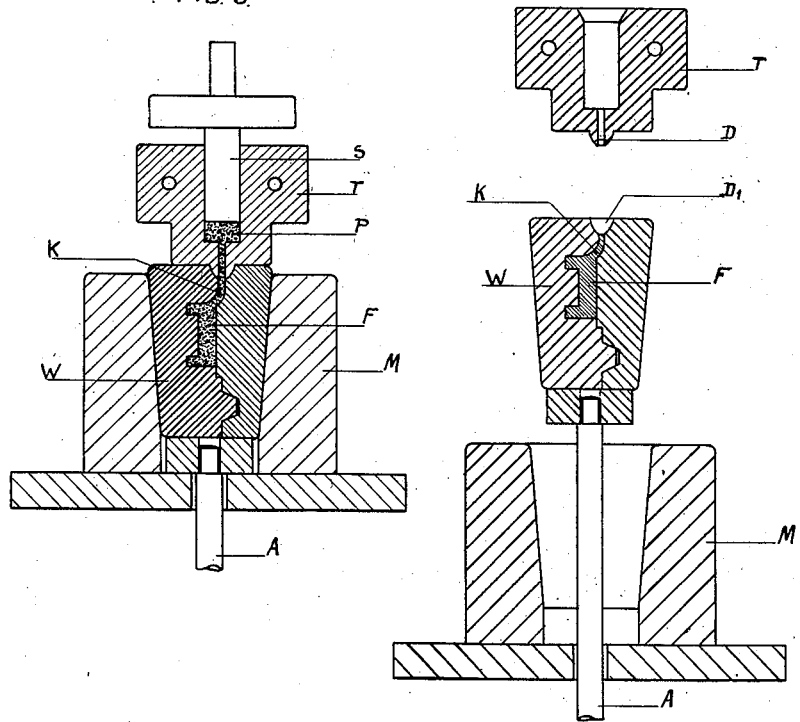

Aug. 17, 1937.  A. SOMMERFELD  2,090,489
PROCESS FOR THE MANUFACTURE OF MOLDED ARTICLES
Filed May 24, 1934  3 Sheets-Sheet 3

Patented Aug. 17, 1937

2,090,489

UNITED STATES PATENT OFFICE 2,090,489

PROCESS FOR THE MANUFACTURE OF MOLDED ARTICLES

Arthur Sommerfeld, Paris, France

Application May 24, 1934, Serial No. 727,230
In Germany June 6, 1933

1 Claim. (Cl. 18—55)

This invention relates to a process for the manufacture of molded articles.

It has already been proposed to work up masses, which are capable of being molded under the application of heat and pressure and which contain heat-hardenable artificial resins as binders, to shaped articles by the injection process, i. e. by forcing the plastic mass under pressure through a nozzle or the like into the hollow space of the mold. These proposals have, however, not been successful in practice.

It has now been found that molded articles of high value can be manufactured in a technically and economically satisfactory manner by operating in accordance with the invention as hereinafter described. Molded articles of the most complicated shapes, which can either not be manufactured at all or only be manufactured with the aid of considerable subsequent working up, by the usual processes, i. e. without the application of the injection process with the simultaneous application of pressure and heat, may also be obtained thereby in a very simple manner and with only very slight subsequent working up.

According to the process of this invention it is possible to mold in metal parts, which was not possible in the usual process hitherto employed. Thus, for example, metal parts consisting of thin sheets may be embedded in the molds without detriment to the manufacture of the molded articles having to be feared. Further, molded articles, in which the embedded metal parts project on both sides, can be prepared without difficulty.

The masses capable of being molded in the hot which serve for carrying out the invention, may be of any desired composition, such as have been hitherto employed in the known pressure and heat processes. Any kind of heat-hardenable resins may be employed as binders in said molding mixtures, if desired in mixture with pigments, plasticizing agents, lubricants, hardening agents such as hexamethylenetetramine, hardening accelerators, and with natural or artificial non-heat-hardenable resins. The hardening accelerators may be basic or acid substances. Said admixtures may be used alone or in mixture with one another. As heat-hardenable resins there may be used, by way of example, resins from the various phenols and aldehydes, such as phenolformaldehyde resins, phenol-furfural resins, urea-phenolformaldehyde resins, furthermore resins from aldehydes, more particularly formaldehyde and urea or urea derivatives, or mixtures of urea and urea derivatives, resinous condensation products from other amines and formaldehyde and the like. There may also be used hardenable natural resins, such as acaroid resins. Mixtures of several hardenable resins may be used together with the before mentioned additions. The heat hardenable resins may be so-called "one-step" resins or "two-step" resins that is to say resins obtained from non-heat-hardenable resins and hardening agents. As fillers there may be used any inorganic or organic, fibrous or non-fibrous substances, such as for example wood-flour, cellulose, asbestos fibres, fabric waste products, powdered marble, barium sulphate, calcium carbonate or the like or mixtures of several fillers. My invention is therefore not limited to any definite composition of the molding mixture. The manufacture of the molding mixture may be effected in any suitable manner, for instance on heated rollers, in mixing machines, by means of working the fillers with melted or dissolved binders and the like.

The following are a few suitable compositions for molding mixtures:

*Wood flour mixtures.*—50 kgms. of wood flour, 50 kgms. of Novolak, 6 kgms. of hexamethylenetetramine, 2 kgms. of nigrosin, 1 kgm. of magnesium oxide and 1.5 kgms. of stearic acid.

*Asbestos mixture.*—60 kgms. of asbestos, 40 kgms. of solid resol resin, 1.6 kgms. of magnesium oxide and 2 kgms. of stearic acid.

Both mixtures may be prepared in the usual manner, for example by mixing on a heated calender and thereafter comminuting.

*Mixture containing urea-thiourea-formaldehyde resin.*—60 kgms. of urea, 76 kgms. of thiourea, 70 kgms. of paraformaldehyde, 50 kgms. of cellulose and 0.1 to 1 kgm. of citric acid are condensed together and mixed to a homogeneous mass with the addition of pigments and lubricants in the usual quantities in a heated kneading machine or in a heated calender and further worked up in the usual manner to a molding mixture.

In carrying out the process according to the invention the mass to be molded is introduced into a suitably heated injecting pot and is heated therein until it is sufficiently plastic to be injected into the mold. The mass to be molded may, for example, be heated in the injecting pot to 80 to 100° C. It is advisable not to heat the mass in the injection pot to a higher temperature than it is necessary to obtain the requisite plasticity. The temperature, to which the mass is heated in the injecting pot, will, of course, depend upon the composition of the mass. The hot mass is forced under high pressure, for example in the case of the usual phenol-formaldehyde molding mixtures about 1000 kgms. per cm.² or more, from the injecting pot into the heated injection nozzle, which should not be too narrow and is connected with the injecting pot and from the latter into the pressure mold. Also other heat-hardenable molding mixtures are worked up under similar high pressures. The mold, before the entry of the mass to be molded, should be heated to approximately the molding temperature or over. By "molding temperature" I mean the temperature generally used in practice if the molding mixture in question is worked to molded articles without the application of the injection process, in a mold which is filled with the comminuted, solid molding mixture by a simultaneous short action of pressure and heat. In the case of molding mixtures containing as binders heat-hardenable phenol-formaldehyde resins, the walls of the mold are heated to about 160–180° C. according to my invention. Such molding mixtures also yield very good results in molds heated to 200–210° C. In the case of molding mixtures which contain other binders, one proceeds in a similar manner, that is to say, the mold is heated to the temperature at which the respective molding mixture is usually molded without application of the injection process, by a short simultaneous action of pressure and heat, or to a higher temperature. The temperature of the mold, according to my process, therefore depends on the composition of the molding mixture. During the introduction of the molding mass into the mold the air escapes from the latter. After filling the mold, the high pressure is still maintained for some time, whereby a certain solidification of the mass very rapidly takes place in the inlet channel of the mold below the injection nozzle, so that a semisolid plug is formed in the inlet channel and closely seals the same. After some time the pressure exerted on the mold is released. The molded article is then left in the mold for a short time longer, amounting for instance to 10 secs. or more according to the size and cross-section of the molded pieces, and may then be expelled in a suitable manner. The pressure in the interior of the mold amounts to a multiple of the pressure in the injecting pot owing to a kind of hydraulic transference of pressure through a semi-solid intermediate body, which is formed by the plug in the inlet channel of the mold. In order to prevent the mass from undergoing premature hardening in the injecting pot, slight pressure is exerted on the mass in the pot after releasing the high pressure, the material in the injecting pot being afforded the opportunity of slowly flowing out by interposing a supporting ring beneath the injecting pot. The material which flows out may be again employed. After expulsion the molded articles may be further hardened in an oven, this being, however, as a rule not necessary.

It is essential for the invention that the working conditions indicated should be observed. The mass in the injecting pot must, therefore, be sufficiently heated to show the degree of plasticity necessary for the injection process, the injecting nozzle and the inlet channel of the mold must also be heated and the mold itself must be heated to the molding temperature or higher; the introduction of the mass into the mold must be effected under the high pressure indicated and the hardening of the molded article must take place under a considerably higher pressure which, as described hereinbefore, is effected according to the invention by maintaining the pressure exerted on the mold for some time longer after filling the mold.

An apparatus serving for carrying out the invention is illustrated by way of example in the accompanying drawings, in which Fig. 1 shows a longitudinal section of the apparatus in the position, in which the mass P to be molded is introduced into the pot T whilst the two-part mold W, provided with a hollow space F, which on filling yields the molded article, is already disposed in the jacket M.

Fig. 2 shows the same apparatus, in which the molding mixture P is slightly compressed by the die or plunger S in the pot T, with the interposition of a ring R, on the mold W, until the commencement of flow of the mass from the channel of the nozzle D of the pot shows that the mass is in the correct condition for flowing out. The mass which has flowed out, may be again returned to the pot for further use. The cross-section of the nozzle amounts, for example, to 30 mm.² or more.

Fig. 3 shows the same apparatus, after removal of the intermediate ring R, in the position in which the mass P is forced with the aid of the die S through the channel into the nozzle D and through the channel K of the mold W into the hollow space F thereof.

Fig. 4 shows the same apparatus after the die S has been withdrawn from the pot D, S and D have been removed from W and W has been lifted so far from the mold casing M by the ejector A that the molded article F may be removed. The pot T is lifted off the mold W after the mass in the channel K has set.

Figure 5:
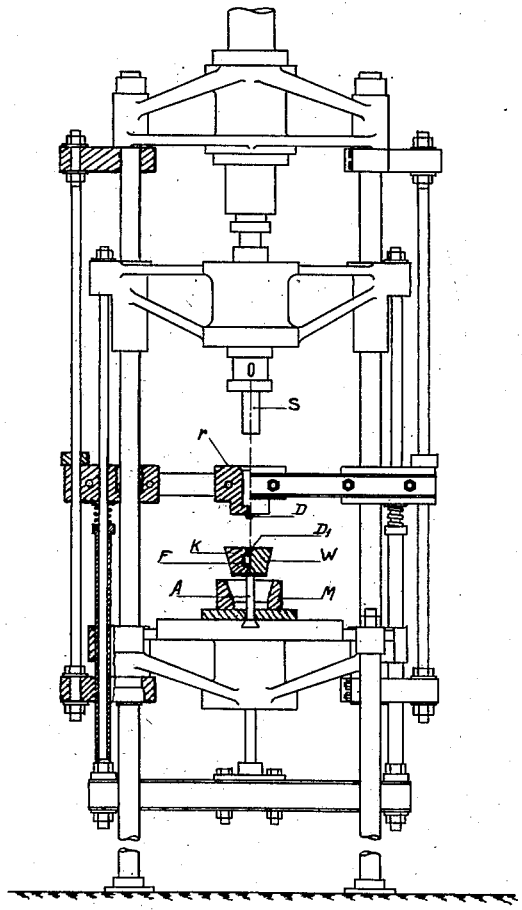
Fig. 5 shows a press partly in section with an injecting device.
Figure 5A:
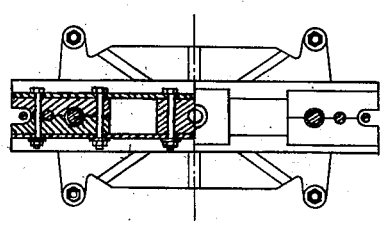

Fig. 5a shows a part sectional plan view of the press shown in Fig. 5. The position shown corresponds to Fig. 4. The pot T is disposed in a traverse, which is guided by the columns of the press. The traverse is of sufficient length to enable the die S to be withdrawn from the pot T, after the traverse has abutted against the adjusting rings disposed on the outer rods.

It is also possible in the hereinbefore described manner to mold resins without the addition of fillers, for example, more or less extensively condensed products, which are still capable of flowing and which may be one-step resins or two-step resins, obtained from non-heat-hardenable resins and hardening agents, if desired in admixture with pigments, plasticizing agents, lubricants, hardening accelerators, other artificial or natural non-heat-hardenable or heat-hardenable resins.

The high pressures employed in carrying out the process described are produced in a simple manner according to the invention by employing for the production of the compressed articles, conically shaped molds which may be disposed in the manner shown in the drawings in correspondingly conically shaped jackets. The expulsion of the compressed articles takes place as also shown in the drawings in the direction of movement of the injection plunger.

It has further been found that valuable molded articles may also be manufactured with the aid of the process described from so-called cold molding mixtures, i. e. masses which are capable of being molded cold, which contain heat-hardenable resins, and also from masses which are capable of being molded warm and which contain non-heat-hardenable products as binders. Cold molding mixtures are, as is known, plastic masses, which are already plastic at ordinary temperature, i. e. at about 15 to 25° C. if necessary under increased pressure. The cold molding mass may contain as binders any desired heat-hardenable resins or non-heat-hardenable products, such as coal tar pitch, brown coal tar pitch or any desired non-heat-hardenable natural or artificial resins. The binders may be liquid at ordinary temperature or may consist of mixtures of binders, which are solid at ordinary temperature, with liquids or solvents.

A cold molding mixture may be prepared as follows:

22 parts by weight of liquid phenol-formaldehyde resin (resol), 42 parts by weight of powdered marble and 36 parts by weight of asbestos are mixed at room temperature in a kneading machine and dried either in the kneading machine itself or in a drying cupboard until the mixture can still just be agglomerated with the hand. The mixture is preferably ground before working up. The quantity of the liquid artificial resin in the mixture may be varied within wide limits. In place of asbestos, asbestine may be employed and in place of powdered marble, talc, kaolin or other powdered minerals. Further additions, for example pigments, plasticizing agents, fire-proofing agents and the like, may also be introduced into the mixture. In order to fix the free phenols and other reactive non-condensed resin constituents still contained in the liquid artificial resins, metal oxides, which simultaneously accelerate hardening and fix water, may be added. When employing phenol-formaldehyde resins solid at ordinary temperature, 50 kgms. of the latter are for example dissolved in 50 kgms. of alcohol and 40 kgms. of this solution are admixed for about one hour at room temperature in a kneading machine with 30 kgms. of asbestos and 40 kgms. of powdered marble. The mixture is dried in the air and ground.

When employing coal tar hard pitch, 70 kgms. of hard pitch are, for example, mixed in the warm with 30 kgms. of anthracene oil. 22 kgms. of the resulting mixture are worked up for about one hour in the warmed kneading machine with 35 kgms. of asbestos and 50 kgms. of powdered slate. This mixture is also ground before molding.

Owing to the plasticity of the cold molding mixtures at room temperature, the temperature in the injecting pot as well as the temperature of the mold must not be higher than room temperature. If, however, a cold molding mixture should have lost any of its flowing capacity, for example by long storage or by evaporation of volatile constituents, the mixture in the injecting pot is slightly warmed, for example to 30 to 40° C. The introduction of the mass from the injecting pot into the mold is effected under high pressure, for example 1200 kgms. per sq. cm. in the injecting pot. The pressure employed must as a rule be higher than when working up masses which are capable of being molded hot. It is further necessary that the nozzle cross-section should be somewhat greater, for example 50 mm.² After filling the mold with the mass the pressure is still maintained for a time, whereby in this case also a semi-solid sealing plug is formed in the channel of the mold. After releasing the pressure the molded article is immediately or a short time thereafter expelled and then subsequently hardened. The subsequent hardening is effected in a manner known per se by heating at gradually increasing temperature. The final temperature of the subsequent hardening amounts in the case of phenol-formaldehyde resin-containing masses, for example to about 160 to 180° C. and in the case of the aforementioned pitch mass to about 210° C. The duration of the hardening treatment is dependent on the wall thickness and size of the molded articles. Hardening may be effected at ordinary pressure in an oven or in a pressure vessel.

The hereinbefore described apparatus may be employed for carrying out the process. It is, however, not necessary, when employing cold molding masses, to allow some of the mass to flow out under reduced pressure by interposing a ring in the manner shown in Fig. 2.

When working up non-heat-hardenable masses capable of being molded warm having a heat resistance of 65 to 100° C. according to Martens the operation is carried out under a pressure of 1000 kgms. per sq. cm. or more and the cross-section of the nozzle must amount to at least 12 mm². These plastic masses contain as binders natural or artificial non-heat-hardenable resins. A natural resin mixture contains, for example, 30 kgms. of copal, 10 kgms. of coal tar hard pitch, 40 kgms. of asbestos and 10 kgms. of powdered marble. After melting down pitch and copal in the heated kneading machine, asbestos and powdered marble are added and the mixture is thoroughly kneaded, for example for one hour. Pitch mixtures contain, for example, 30 kgms. of coal tar pitch, 40 kgms. of asbestos and 20 kgms. of powdered slate. The pitch is melted down in the heated kneading machine, asbestos and powdered marble are then added and the mixture kneaded, for example for one hour. This mixture issues from the kneading machine in the form of coarse fragments and is ground after cooling to groats or powder. The temperature in the injecting pot is so selected that the mixture is heated to a temperature in excess of the flowing temperature. Natural resin mixtures are heated, for example, in the injecting pot to 220 to 240° C., pitch mixtures to 130 to 140° C. The temperature of the mold amounts in the case of natural resin mixtures to 100 to 150° C. and in the case of pitch mixtures to 50 to 60° C. The mixtures are accordingly superheated in the injecting pot in both cases and injected into the relatively cold mold, whereby solidification rapidly takes place. Whilst maintaining the pressure after filling the mold, a semi-solid plug is also formed with this mass in the channel of the mold and gives rise to a considerable increase of pressure in the interior of the mold. The molded articles may be removed from the mold a few seconds after the formation of the semi-solid plug. In the case of this mass also it is not necessary to allow some of the compression mass to flow under reduced pressure from the injecting pot whilst interposing a ring or the like in the manner illustrated in Fig. 2.

I claim:

A method of molding a resinous composition of the type which hardens when it is heated to a predetermined temperature, which consists in forcing said resinous composition in a heated and plastic state from a storage space to a molding space by means of high pressure which is applied in said storage space, said resinous composition being forced through a channel whose mean cross section is less than the mean cross section of said storage space and of said molding space, maintaining the pressure in said storage space and in said channel and in said molding space after said molding space has been completely filled for a period of time sufficient to cause the composition in said channel to be at least partially solidified while the composition in said molding space remains in the plastic state, relieving the high pressure on said storage space to a point where only slight pressure is exerted on said resinous composition therein disengaging said storage space from said molding space and then allowing said resinous composition to flow slowly from the storage space in order to prevent premature hardening thereof.

ARTHUR SOMMERFELD.